United States Patent [19]

Bogner

[11] Patent Number: 4,466,090
[45] Date of Patent: Aug. 14, 1984

[54] RADIAL TRANSMISSION CANCELLATION DEVICE

[75] Inventor: Bruce F. Bogner, Mt. Holly, N.J.

[73] Assignee: RCA Corporation, New York, N.Y.

[21] Appl. No.: 364,689

[22] Filed: Apr. 2, 1982

[51] Int. Cl.³ .......................... H04N 5/83; G11B 9/06
[52] U.S. Cl. ..................................... 369/126; 369/129
[58] Field of Search ....................... 369/126, 129, 151; 358/342

[56] References Cited

U.S. PATENT DOCUMENTS

| | | | |
|---|---|---|---|
| 3,872,240 | 3/1975 | Carlson et al. | 369/126 |
| 3,872,265 | 3/1975 | Hilliker | 369/126 |
| 4,080,625 | 3/1978 | Kawamoto et al. | 369/129 |
| 4,152,641 | 5/1979 | Hughes et al. | 369/129 |

Primary Examiner—Donald E. McElheny, Jr.
Attorney, Agent, or Firm—E. M. Whitacre; P. J. Rasmussen; R. G. Coalter

[57] ABSTRACT

In a record playback system, such as a video disc player, there is tendency to radiate energy at a given frequency from the vicinity of the stylus where the stylus passes through the carriage bottom during playback. A first radial transmission waveguide path is provided in association with the carriage bottom. A second radial transmission waveguide path is provided between the carriage bottom and the record. The first and second paths are made to differ from one another by 180 electrical degrees. There is thus a reduction in radiated energy at the given frequency in the radial location which forms the common end of the first and second paths by signal cancellation at this common location.

9 Claims, 3 Drawing Figures

RADIAL TRANSMISSION CANCELLATION DEVICE

The present invention relates generally to a technique for reducing RF energy radiated or received by a record playback device.

In a particular example of a record playback system, information is recorded in the form of geometric variations in the information track of a conductive plastic disc record. These geometric variations represent recorded modulated carrier signals. The particular example is that of a capacitive video disc system where FM modulated carrier signals are recorded as geometric variations in the depth of the information track. The recorded television signal is retrieved from the video disc by detecting the change in capacity between an electrode on a stylus (such as a diamond stylus) and a conductive property of the disc. This disc-stylus capacity changes as a function of the carrier modulation of the information track when the record is rotated during playback.

This resultant changing capacity is then coupled to a tuned line in a resonator assembly which is driven by an oscillator operating at a particular RF frequency. Changing capacity from the stylus modulates the resonant frequency of the tuned line, this changes the operating point of the oscillatory energy on the tuned line. This in turn amplitude modulates the oscillator signal. The amplitude modulated oscillator signal is then applied to a detector circuit which peak rectifies the oscillator signal.

In U.S. Pat. No. 3,842,194, issued to J. K. Clemens, a video disc system of the type mentioned above is generally described. U.S. Pat. No. 4,080,625, issued to H. Kawamoto describes in detail a pickup circuit of the type generally described above. U.S. Pat. No. 4,305,145, issued to L. Hughes, et al., shows generally a player mechanism suitable for a video disc system of the type previously described.

In a particular video disc playback device, the above mentioned oscillator in the pickup circuit operates at 915 MHz. The oscillator and the tuned circuit are both positioned within a conductive enclosure or arm carriage. The arm carriage is used to support and translate a stylus/stylus arm assembly.

To begin playback, the arm carriage is positioned over the record, which is rotated by a turntable, and the stylus arm is lowered so that the stylus at the end of the stylus arm engages the information track of the record. Although the arm carriage is a substantially enclosed metal box, an opening must be provided in the bottom of the carriage to permit stylus/record contact. It has been found that this carriage bottom opening allows energy at 915 MHz and to a lesser extent harmonics thereof, to radiate out of the carriage area.

In the United States, the level of radiation at 915 MHz for the type of player described above, is below the maximum permissible levels set for such devices. However, in other locations, such as some countries in Europe, the amount of radiation at the oscillator fundamental frequency may exceed the local permissible levels. Further, in any location there is concern about the susceptibility of the player to interference from local sources of radiation.

The present invention provides a solution to the problem of the energy radiation (or susceptibility) levels at the oscillator fundamental frequency generated at the carriage bottom opening in a player of the type described above. In accordance with the present invention, apparatus is provided which comprises a means attached to the bottom of the arm carriage for providing a radial transmission wave guide path from one radial location near the opening in the bottom of the carriage to another radial location at the bottom of the carriage. A second radial transmission wave guide path is formed between the carriage bottom and the record from the one radial location to the second radial location. The first path length is designed to differ by 180 electrical degrees at the given or fundamental frequency of the oscillator. The radiation of energy at the given frequency at the second radial location is thereby substantially reduced.

In general, and in the absence of the use of the present invention, it is believed that during normal playback operations radiation is initiated by E-fields originating at the stylus and propagating radially outward between the parallel plates formed by the bottom surface of the conductive arm carriage and the conductive video disc record. Since the arm carriage has an elongated rectangular bottom surface and since the carriage is variously positioned over the beginning, middle and center of the record during playback the resultant radiation as the E-fields reach the open end of their guided path is unsymmetrical.

This radiation comes about as a result of the fact that the arm carriage contains an oscillator providing a signal at, for example, 915 MHz and the stylus protrudes from the metallic, shielded carriage to contact the disc record. The end of the stylus acts, in effect, like an antenna and excites the radial transmission line formed by the underside of the carriage and the disc record itself. It is the purpose of the present invention to reduce the radiated energy from the stylus-disc interface (and reduce the susceptibility of the player to interference at 915 MHz by the theory of reciprocity). The present invention achieves the desired result through the technique of signal cancellation.

Figures 1, 2:
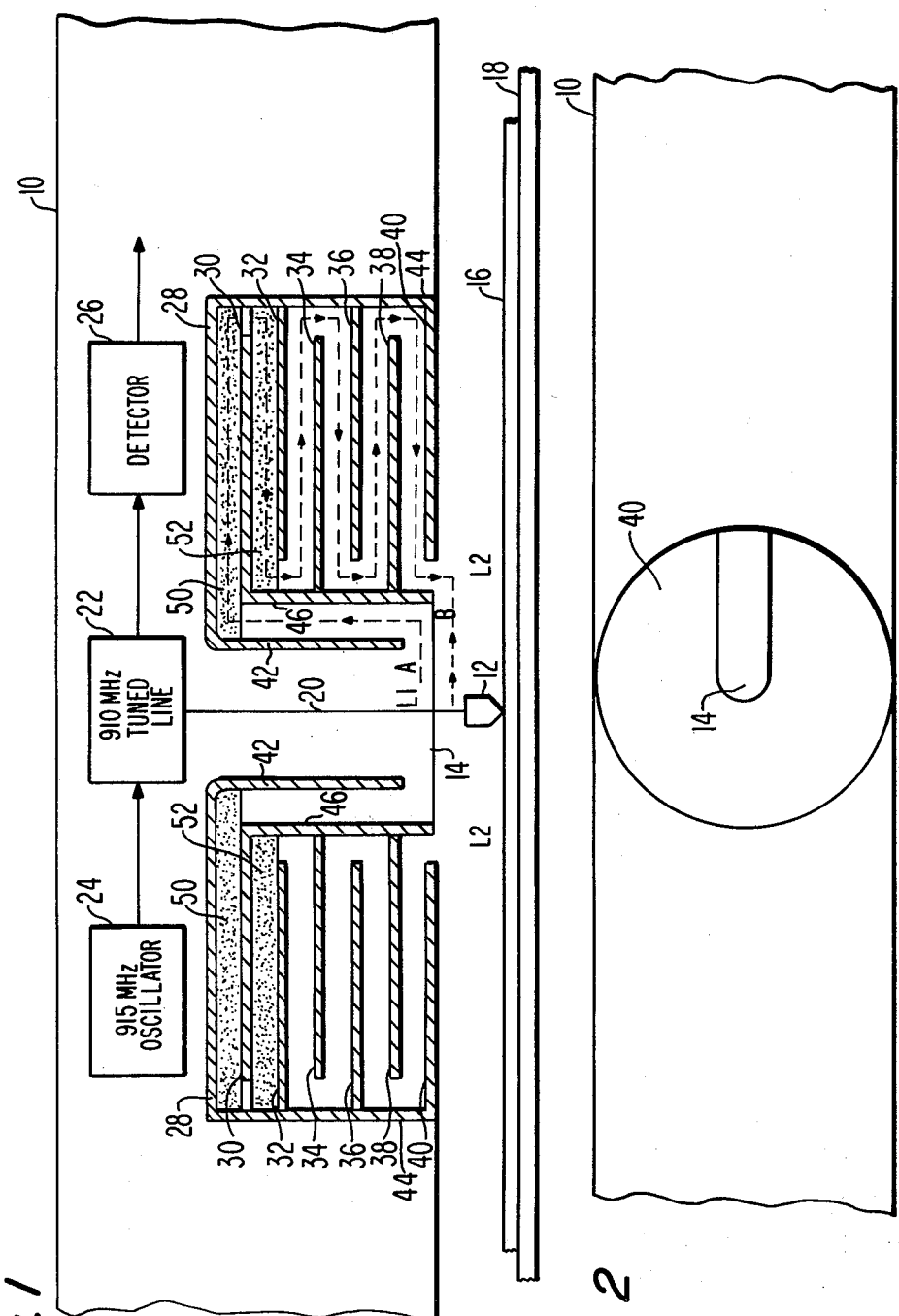
FIG. 1 is a diagrammatic representation of the side view of a video disc arm carriage incorporting the present invention.
FIG. 2 is a diagrammatic representation, not to scale, of the bottom of the arm carriage of FIG. 1.

FIG. 1 shows the side view of a substantially enclosed conductive arm carriage 10 having the signal cancellation apparatus formed in conjunction with the bottom of the carriage. A stylus 12 is shown protruding through an opening 14 to make contact with a record 16 resting on a turntable 18.

A flylead 20, shown schematically in FIG. 1, couples signals from the electrode of the stylus to a 910 MHz tuned line 22. An oscillator 24 is provided in the arm carriage to inject the 915 MHz signal into the tuned circuit which will then be modulated by the varying capacity of the stylus-disc interface as previously described. The amplitude variations of the 915 MHz signal which come from the changes in capacity are peak detected in circuit 26 and the detected signal is then available for further processing to recover the originally recorded video information.

The stylus which is on one end of a stylus arm in a cartridge (not shown) is positioned in the carriage 10 which then supports and translates the stylus/stylus arm assembly radially over the record during playback.

The cancellation apparatus shown in FIG. 1 may be viewed as being formed from a plurality of circular conductive disc sections arranged concentrically one above the other to form a folded radial transmission waveguide. The circular conductive disc sections are designated as 28, 30, 32, 34, 36, 38 and 40. The circular disc section 40 is electrically connected to the bottom of the arm carriage. Disc section 28 is joined to the inner vertical wall 42 and to the outer vertical wall 44. Walls 42 and 44 may be thought of as the respective walls of two concentric cylinders which are coaxial with a vertical axis of symmetry through the opening 14. Disc sections 30, 34 and 38 are connected to the vertical cylinder wall 46. The cylinder having conductive wall 46 is also coaxial with the cylinders having walls 42 and 44. Disc sections 32, 36 and 40 are connected to the vertical cylinder wall 44.

As can be seen in FIG. 1, the plurality of conductive disc like members form a radial transmission waveguide path A, shown by the dotted line between a first radial location, L1, near the stylus and a second radial location, L2, along the bottom of the arm carriage.

As previously noted, another radial transmission waveguide is provided between the bottom of the arm carriage and the disc record 16. Consider now the straight path B from radial location L1 to radial location L2 along the waveguide formed by the carriage bottom and the record 16.

Path A, the folded path, is made to have an electrical path length which is substantially 180 electrical degrees different (or an odd integer multiple of 180 degrees) from the electrical path length of path B at the oscillator frequency of 915 MHz. That is, by way of illustration, if path B is a radial distance which is equivalent to an eighth wavelength (45°) at 915 MHz, then path A is designed to be five-eighths of a wavelength (225°) at 915 MHz.

If the amplitude of the signals radiated at 915 MHz along path A are equal in amplitude to the signals at 915 MHz propagating along path B, then at location L2 there should be good cancellation of the 915 MHz energy.

In FIG. 1, path A is folded in six layers, i.e., discs 28–40 are spaced and interleaved as shown to create the six layers and as long as the length of path A differs by 180 electrical degrees from path B cancellation of radiation at the given frequency should take place. However, it is possible to make the overall structure smaller by the dielectric loading of path A. For example, if the length of path B is x degrees, then the length of path A is $x+\theta$ degrees, where $\theta = 180°$, with air as the dielectric. For the case where x=0.01 wavelengths, path A would be 0.51 wavelengths long. Now, if path A is loaded with a ceramic dielectric having a relative dielectric constant $\delta$ of 9, then path A has a length of $(\sqrt{\delta})(x+\theta)$ degrees. The value of $\theta$ to give a path length difference of 180 degrees turns out to be $180-x(\sqrt{\delta}-1)/\sqrt{\delta}$ degrees. Thus for x=0.01 wavelengths, path A would be 0.17 wavelengths at 915 MHz compared to 0.51 wavelengths for the air dielectric case. In FIG. 1, elements 50 and 52 represent two layers of dielectric for illustrative purposes.

FIG. 2 represents the bottom of the arm carriage 10. The opening 14 is extended along the long dimension of the arm carriage bottom to create a radial slot for the stylus arm so that the stylus and part of the stylus arm can pass through the bottom to accomplish stylus/record engagement. Since the structure shown in FIG. 1 comprises radial transmission lines, a radial slot of the size needed to allow physical passage of the stylus/stylus arm through the structure will not support appreciable radiation of energy through the slot. Also, since transmission path A does not exist in the region of the slot, no cancellation can take place in the direction of the slot.

Figure 3:
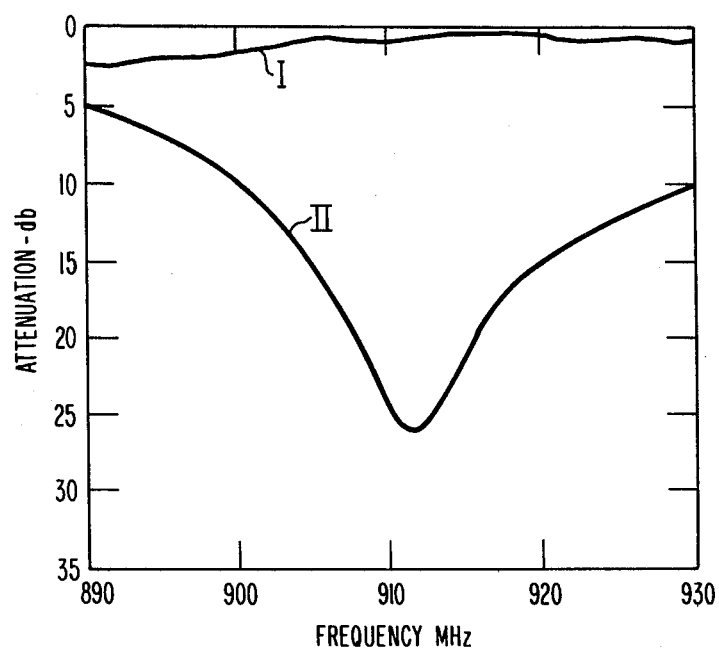
FIG. 3 is a graph illustrating the benefits of the use of the present invention.

FIG. 3 is a graph which shows the general form of the results which can be expected with structure in accordance with the present invention. Waveform I represents energy measured at the end of the radial transmission waveguide formed between the carriage bottom and the record, i.e., at the edge of the width dimension of the carriage in the absence of the cancellation structure across a band of frequencies. Curve II shows the measured energy at the same place when the two paths A and B are set up in accordance with the present invention. At the fundamental frequency of the oscillator, i.e., 915 MHz, there is about at 25 dB drop in measured signal strength. Curve II was the result of a six fold path A with a ceramic dielectric in each of the six layers.

What is claimed is:

1. In a record playback system of the type having a substantially enclosed conductive arm carriage for supporting and translating a stylus/stylus arm assembly during playback, said carriage being operatively positioned above said record, said carriage having an opening in the bottom thereof to permit selective stylus/record engagement, said player including an oscillator providing a signal at a given frequency, the apparatus comprising:

means attached to the bottom of said arm carriage for providing a radial transmission waveguide path from one radial location near said carriage opening to another radial location along the bottom of said arm carriage;

a second radial transmission waveguide path being formed between said carriage bottom and said record from said one radial location to said other radial location;

said first path being arranged to have a path length which differs by substantially an odd multiple of 180 electrical degrees from the second path at said given frequency;

whereby radiation of energy at said given frequency is substantially reduced at the second radial location.

2. The apparatus according to claim 1 wherein said means provides said first radial transmission waveguide path in a folded configuration and wherein said second radial transmission waveguide path is a straight path.

3. The apparatus according to claim 2 wherein said means comprises a plurality of coaxial disc-like conductive members to form said first radial transmission waveguide path.

4. The apparatus according to claim 3 further comprising a dielectric material positioned in said first radial transmission waveguide path.

5. The apparatus according to claim 4 wherein said dielectric material has a relative dielectric constant of about 9.

6. In a video disc record playback system of the type having a substantially enclosed conductive arm carriage for supporting and translating a stylus/stylus arm assembly during record playback, said carriage being operatively positioned above said record, said carriage having an opening in the bottom thereof to permit selective stylus/record engagement, said carriage enclosing an oscillator providing a signal at a given frequency, the apparatus comprising:
- a plurality of conductive disc-like members coaxially aligned with said opening in said carriage bottom, said discs being spaced from one another and interleaved with one another such that a first radial transmission waveguide path is formed connecting a first radial location near said stylus to a second radial location along the bottom of said carriage;
- a second radial transmission waveguide path being formed between said carriage bottom and said record for coupling said first radial location to said second radial location;
- said first path being arranged to have a path length which differs by substantially 180 electrical degrees relative to the electrical length of said second path at said given frequency;
- whereby radiation of energy at said given frequency is substantially reduced at said second radial location.

7. The apparatus according to claim 6 wherein said second radial location is at a distance from said opening which is less than the radius of any of the disc-like members.

8. The apparatus according to claim 7 further comprising a dielectric material positioned in said first radial transmission waveguide path.

9. The apparatus according to claim 7 wherein said dielectric material has a relative dielectric constant of about 9.

* * * * *